(No Model.)
A. B. AUSTIN.
DUST PAN.
No. 360,643. Patented Apr. 5, 1887.
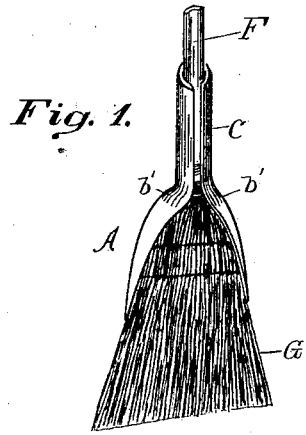
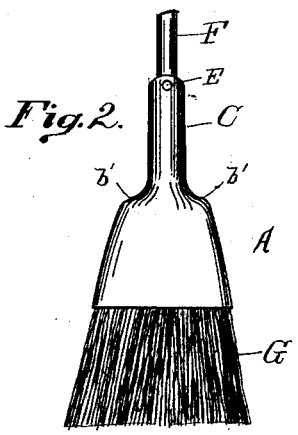
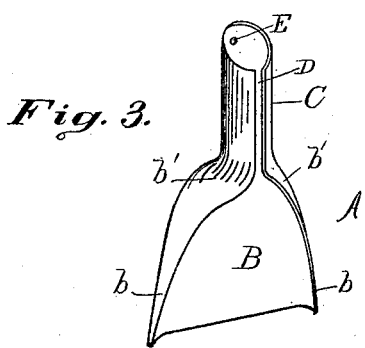
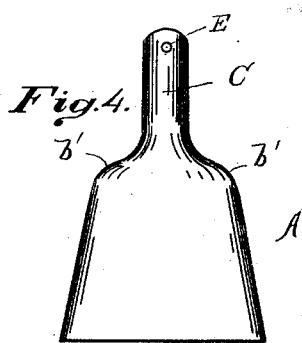
Attest
J. D. Kilmer
Jno. W. Strehli.
Inventor
Aronamous B. Austin
per Wm. Hubbell Fisher,
Att'y

UNITED STATES PATENT OFFICE.

ARONAMOUS B. AUSTIN, OF FORT WAYNE, INDIANA.

DUST-PAN.

SPECIFICATION forming part of Letters Patent No. 360,643, dated April 5, 1887.

Application filed April 5, 1886. Serial No. 197,781. (No model.)

*To all whom it may concern:*

Be it known that I, ARONAMOUS B. AUSTIN, a resident of the city of Fort Wayne, county of Allen, State of Indiana, have invented certain new and useful Improvements in Dust-Pans, of which the following is a specification.

The object of my invention is to provide a dust-pan which may be easily attached to a broom without interfering with the action of the latter. By being always attached to the broom the pan is always at hand when needed, making the article consisting of the broom and attached pan a most useful one.

In the accompanying drawings, forming part of this specification, Figure 1 is a perspective view of a broom with attached dust-pan. Fig. 2 is an elevation showing that side of the broom and pan which is hidden in Fig. 1. Fig. 3 is a perspective view of the dust-pan detached. Fig. 4 is a rear elevation of the dust-pan detached.

The dust-pan A is made of metal, rubber, or paper, or other suitable material, and is preferably formed in a single piece pressed or stamped into shape. The flat part B of the pan has its edges turned up, forming the sides $b$. These edges are turned up more and toward the handle of the pan, forming the shoulders $b'$. The handle C is a roll, the edges of which may touch, but preferably have the space D between them. The handle is continuous with the flat part B and with the shoulders $b'$ of the remainder of the pan. The shoulders $b'$ give a spring to the handle C. The handle C is preferably provided with the opening E.

The pan is attached to the broom, as shown in Figs. 1 and 2, the handle F of the broom passing through the hollow handle C of the pan. The rest of the pan fits over the body of the broom, and the spring-handle, clasping the broom-handle, holds the pan in position. The hollow handle C, being a spring, will fit broom-handles of different sizes.

The convenience of always having the dust-pan and broom together is very apparent. When desired, however, the pan may be detached from the broom and hung up by means of the hole E.

I am aware that there has been patented a dust-pan having a hollow rigid cylindrical handle to be slipped over a broom-handle, and therefore do not claim the same; but

What I claim as new, and desire to secure by Letters Patent, is—

1. A dust-pan provided with a hollow slitted spring-handle, C, the said pan and handle being formed or stamped out of one piece of material, as and for the purposes set forth.

2. The dust-pan having flat part B, sides $b$, shoulders $b'$, and hollow spring-handle C, having slit D, as and for the purposes specified.

3. The combination of a dust-pan provided with a hollow slitted spring-handle, C, and the broom F G, substantially as and for the purposes specified.

ARONAMOUS B. AUSTIN.

Attest:
JOHN P. HANCE,
JACOB J. KERN.